United States Patent [19]

Yoshimura et al.

[11] Patent Number: 4,603,753

[45] Date of Patent: Aug. 5, 1986

[54] AUTOMATIC RUNNING WORK VEHICLE

[75] Inventors: Shingo Yoshimura, Sakai; Katsumi Ito, Osaka; Shigeru Tanaka, Osaka, all of Japan

[73] Assignee: Kubota, Ltd., Japan

[21] Appl. No.: 560,798

[22] Filed: Dec. 13, 1983

[30] Foreign Application Priority Data

Aug. 29, 1983 [JP] Japan .................................. 58-157541
Oct. 5, 1983 [JP] Japan .................................. 58-187345

[51] Int. Cl.⁴ .............................................. B62D 1/00
[52] U.S. Cl. ..................................... 180/131; 180/168; 56/10.2; 56/DIG. 15
[58] Field of Search ............... 180/131, 234, 168, 169, 180/79; 318/587; 250/202; 56/10.2, DIG. 15, DIG. 7; 244/175

[56] References Cited

U.S. PATENT DOCUMENTS

| | | | |
|---|---|---|---|
| 3,079,107 | 2/1963 | Auld | 244/175 |
| 3,952,828 | 4/1976 | Stampfer | 180/131 |
| 4,184,559 | 1/1980 | Rass | 180/131 |
| 4,211,921 | 7/1980 | Kanetou | 180/169 |
| 4,299,172 | 11/1981 | Dawson | 180/79 |
| 4,515,221 | 5/1985 | Van der Lely | 180/131 |

*Primary Examiner*—John J. Love
*Assistant Examiner*—Everett G. Diederiks
*Attorney, Agent, or Firm*—Kane, Dalsimer, Kane, Sullivan and Kurucz

[57] ABSTRACT

An automatic running work vehicle adapted to repeatedly work on the ground while automatically changing its running direction and provided with means for controlling the vehicle body so that the vehicle body will be automatically positioned, upon a change of direction after finishing one course, for the next course with its orientation and position in match with the boundary of the course.

8 Claims, 6 Drawing Figures

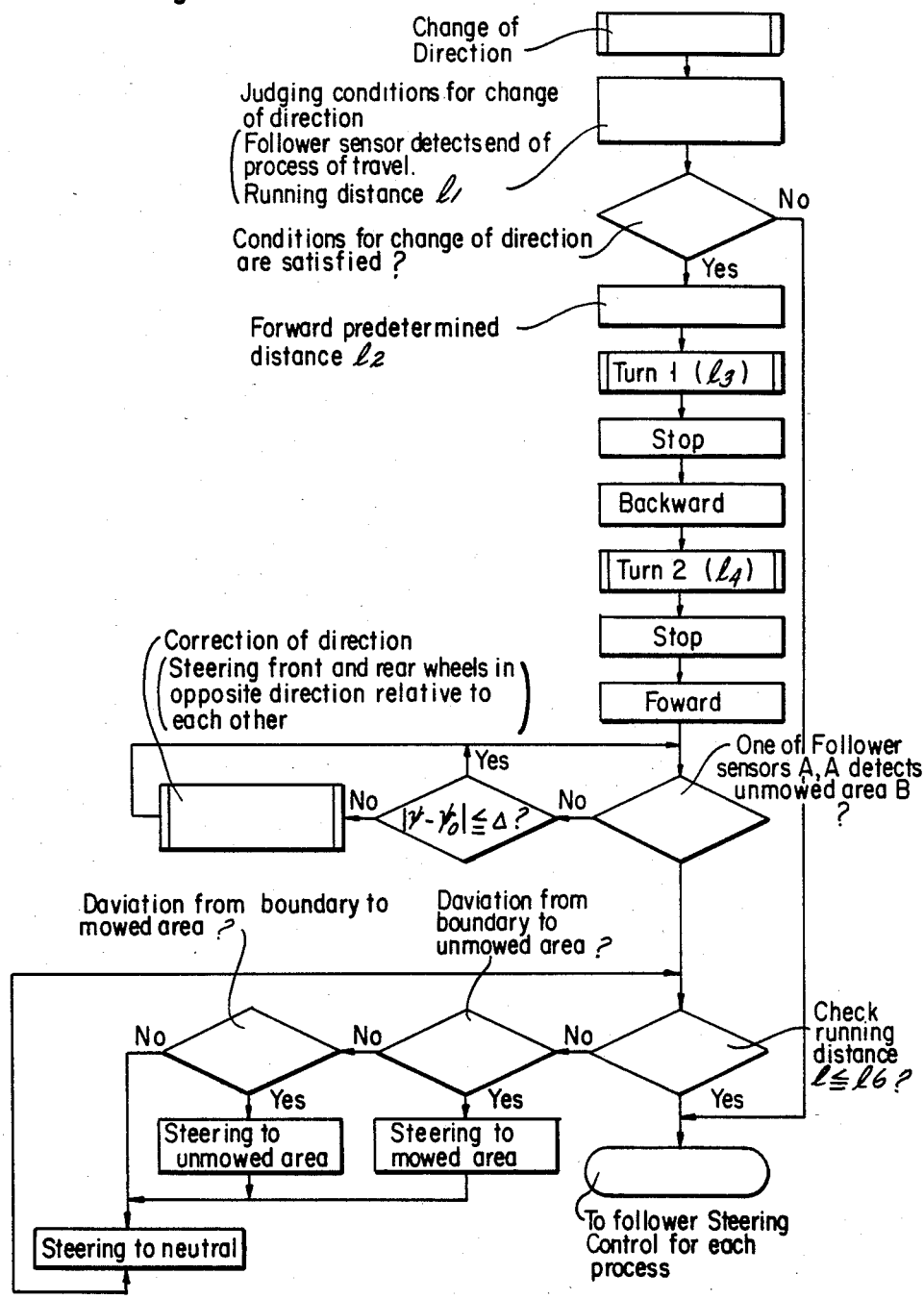

AUTOMATIC RUNNING WORK VEHICLE

BACKGROUND OF THE INVENTION

The present invention relates to an automatic running work vehicle, and more particularly to a work vehicle adapted to automatically run on a work site of specified range in accordance with a running sequence for the vehicle to run a plurality of predetermined running courses based on the result obtained by detecting the boundary between a worked area and an unworked area with follower sensors during running and in accordance with a direction change sequence for the vehicle to move from one completed running course to the next running course.

Conventionally, when an automatic running work vehicle of this type, such as a mowing vehicle or like ground working vehicle, is to work automatically on the ground at a work site of specified range the surroundings of which have been worked on in advance, the work area is divided into a plurality of running courses each corresponding to the working width, and the vehicle is controlled to automatically run the courses one after another.

The vehicle runs the courses according to a reciprocating running sequence in which case the running courses are set in parallel such that the vehicle changes its orientation through 180 degrees when moving from course to course, or according to a sequence in which case the courses extend along the outer periphery of the work area are arranged successively inward of the area for the vehicle to move from course to course by changing its orientation through 90 degrees. In either mode, the vehicle runs each course while being subjected to follower steering control based on the result obtained by detecting the boundary of the course with follower sensors, so that the vehicle runs with relatively small amounts of deviation from the desired direction. However, when changing the direction at the end of each course, the vehicle body, which is generally subjected to a definite pattern control according to a preset sequence, is likely to zigzag excessively before moving along the boundary of the next cource owing to deviation, thereby leaving irregular work traces in the vicinity of the ends of the courses.

SUMMARY OF THE INVENTION

An object of the present invention, which has been accomplished in view of the above, is to provide an automatic running work vehicle which is adapted to repeatedly work on the ground while automatically changing its running direction and which is provided with means for controlling the vehicle body so that the vehicle body will be automatically positioned, upon the change of direction, for the next course with its orientation and position in match with the boundary of the course.

To fulfill the above object, the automatic running work vehicle of the present invention is characterized in that the vehicle is provided with front wheels and rear wheels are adapted for steering, an orientation sensor for detecting the orientation of the body of the vehicle, and means for automatically steering the vehicle body for the correction of the orientation thereof so that the orientation detected by the orientation sensor matches a predetermined reference orientation after the start of a change of direction according to a direction change sequence before follower sensors detect the starting end of the next running course, the steering means being adapted to steer the front wheels and the rear wheels in the same direction to correct the position of the vehicle body laterally thereof relative to the next running course based on the result obtained by detecting the boundary of the next course with the follower sensors while the vehicle subsequently runs a predetermined distance.

Because of the above feature, the present work vehicle has the outstanding advantage described below.

The vehicle body has its orientation corrected after changing the direction at the rear end of each running course before reaching the front end of the next running course, and is subsequently translated while running a predetermined distance and has its position thereby corrected laterally thereof relative to the next course so as to be promptly positioned along the boundary of the next course. Accordingly when the vehicle starts working on the next course, the orientation and position of the vehicle body are in match with the boundary of the course, enabling the vehicle to leave very straight work traces from the front end of each course.

Other advantages of the present invention will become apparent from the following description.

BRIEF DESCRIPTION OF THE DRAWINGS

The drawings show embodiments of automatic running work vehicle of the present invention.

FIG. 5 is a flow chart showing the operation of the vehicle control unit.

DESCRIPTION OF THE PREFERRED EMBODIMENTS

Figure 1:
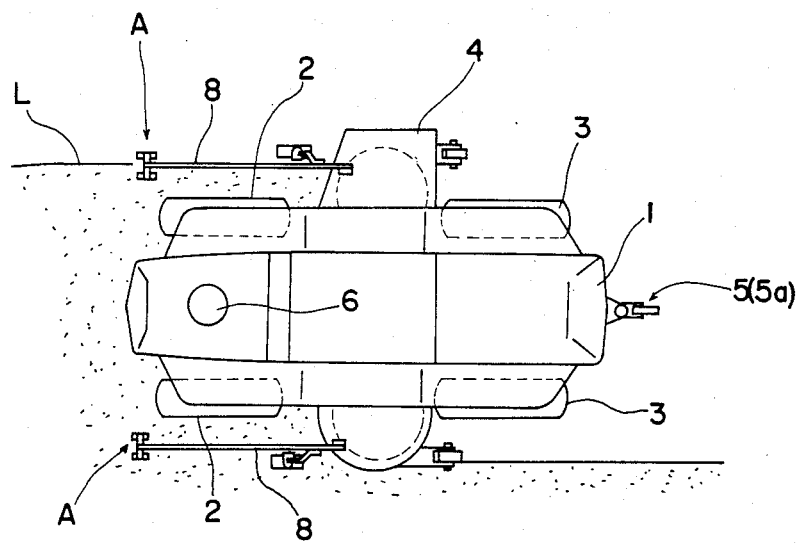
FIG. 1 is an overall plan view showing a mowing vehicle.

FIG. 1 shows a mowing vehicle as an automatic running work vehicle. The body 1 of the vehicle has front wheels 2, 2 and rear wheels 3, 3 all of which can be steered. The vehicle body 1 is provided with a mower 4 incorporating cutting disk blades and vertically movably suspended from an intermediate portion thereof. The vehicle body 1 further has follower sensors A, A of the construction to be described below for detecting a boundary L so as to run automatically along the boundary L while working on the ground.

The vehicle body 1 is further provided with a fifth wheel 5a serving as a distance sensor 5 for generating a pulse signal per unit length for continuously detecting the distance of travel of the vehicle body 1 and with a geomagnetic or like orientation sensor 6 adapted to detect the orientation of the vehicle body 1 by sensing the variation in the intensity of geomagnetism.

The follower sensor A comprises two photosensors S1, S2 arranged adjacent to each other laterally of the vehicle body 1 and is adapted to detect the boundary L between an unmowed area B as an unworked area and a mowed area C as a worked area on each course of reciprocating travel of the vehicle body 1.

Figure 2:
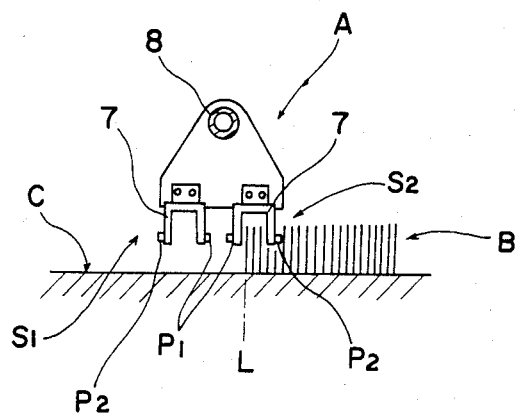
FIG. 2 is a fragmentary front view of a follower sensor.

As seen in FIG. 2, a sensor mount frame 8 attached to the mower 4 is fixedly provided with substantially U-shaped sensor frames 7, 7. Each of the photosensors S1, S2 includes a pair of light-emitting element P1 and photocell P2 attached to opposite sides of the sensor frame 7 for sensing the presence or absence of grass to be brought into the space therebetween with travel of the vehicle body 1 to detect the boundary L between the unmowed area B and the mowed area C. The light-emitting element P1 emits the light toward a photocell P2. Therefore, each photosensor senses the presence of grass when photocell P2 does not receive light from the corresponding light-emitting element P1 by the interference of grass therebetween. The sensor A is not limited to the photosensors S1, S2 but can be composed of other sensors of the non-contact or contact type or any other type of sensors.

Figure 3:
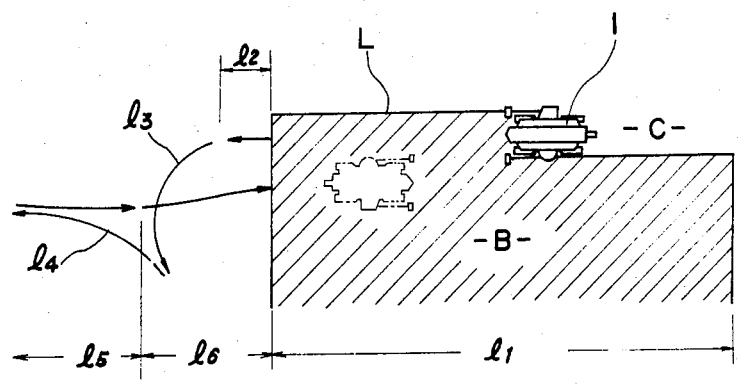
FIG. 3 is a diagram showing a mode of changing direction.

With reference to FIG. 3, the vehicle mows a site the surroundings of which have been mowed in advance as indicated at C while automatically running along the boundary L between the unmowed area B and the mowed area C. The vehicle repeatedly reciprocatingly runs its courses, automatically changing the running direction at the rear end of each course.

A control system will be described below for automatically changing the direction at the end of each course.

Figure 4:
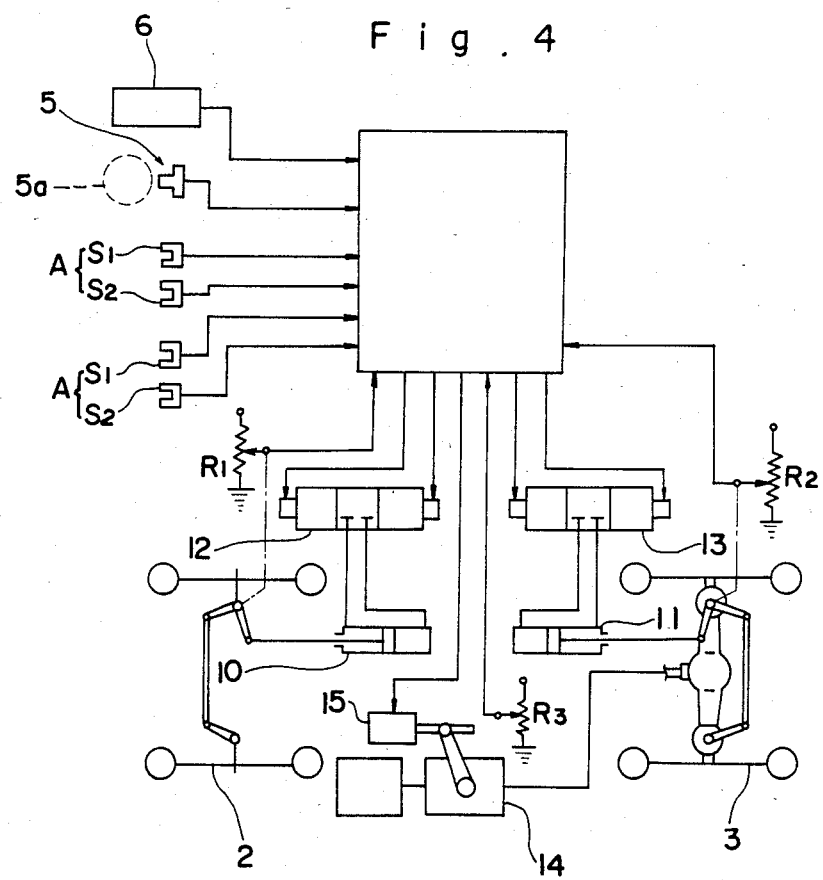
FIG. 4 is a block diagram showing a control system.

With reference to FIG. 4 showing the control system, the follower sensors A, A, the distance sensor 5 and orientation sensor 6 feed signals to a control unit 9 which consists essentially of a microcomputer. Based on the results obtained by detecting the boundary L, running distance l and orientation $\Psi$ with the sensors A, A, 5 and 6, the control unit 9 calculates and delivers control signals for driving electromagnetic valves 12, 13 which operate hydraulic cylinders 10, 11 serving as actuators for steering the front wheels 2, 2 and the rear wheels 3, 3 and control signals for driving a motor 15 serving as an actuator for operating stepless speed change means 14 for speed changes.

When both the follower sensors A, A detect the mowed area C and the accumulated running distance l detected by the distance sensor 5 reaches a predetermined distance $l_1$ after the vehicle body 1 has automatically run one course based on the result of detection of the boundary L by the follower sensor A as seen in FIG. 3, the vehicle changes its running direction automatically toward the next course by turning through 90 degrees forward and backward twice according to a prescribed sequence.

To turn the vehicle body 1 through 90 degrees first (turn 1) for the change of direction, the vehicle body is advanced straight a predetermined distance $l_2$ corresponding to the installation spacing between the follower sensor A and the mower 4, with the front wheels 2, 2 and the rear wheels 3, 3 both held in neutral position, and is thereafter advanced a predetermined distance $l_3$ while being turned through 90 degrees toward the unmowed area B, with the front wheels 2, 2 and the rear wheels 3, 3 steered at a specified angle toward opposite directions.

Subsequently the speed change means 14 is changed-over to reverse position, and the front wheels 2, 2 and the rear wheels 3, 3 are then steered at a predetermined angle in directions in opposite relation to the turn 1, whereby the vehicle body is turned through 90 degrees the second time (turn 2) while being driven backward a predetermined distance $l_4$.

With the speed change means 14 then changed over to forward position, the vehicle body 1 is advanced straight through an approach section $l_5$ before reaching the front end of the next course where the follower sensors A, A detect the unmowed area B or boundary L, whereby the change of direction is completed. While running through this approach section $l_5$, the vehicle body 1 has its orientation corrected. While the vehicle body 1 subsequently runs a predetermined distance $l_6$, corresponding to the installation spacing between the follower sensor A and the mower 4, immediately before actually resuming the mowing operation, the vehicle body 1 has its position corrected laterally thereof relative to the next course so as to start mowing on the next course in the proper position along the boundary L.

More specifically stated, while the vehicle body 1 runs through the approach section $l_5$, the orientation $\Psi$ detected by the orientation sensor 6 is compared with a preset reference orientation $\Psi_0$, and the front wheels 2, 2 and the rear wheels 3, 3 are steered at the same predetermined angle in opposite directions to match the detected orientation $\Psi$ with the reference orientation $\Psi_0$, i.e., to automatically correct the orientation of the vehicle body 1 and thereby orient the vehicle body in match with the direction of the next course.

When one of the follower sensors A,A thereafter detects the mowed area B while the vehicle runs the predetermined distance $l_6$, the front wheels 2, 2 and the rear wheels 3, 3 are steered at the same predetermined angle in the same direction to translate the vehicle body without altering the orientation thereof and correct the position of the body 1 laterally thereof, whereby the vehicle body is positioned along the boundary L of the next course.

FIG. 4 further shows potentiometers R1, R2 for detecting the actual steering angles of the front wheels 2, 2 and the rear wheels 3, 3, respectively, for the feedback of the data to the control unit 9, and a potentiometer R3 for detecting the speed change position of the speed change means 14 for the same purpose.

FIG. 5 is a flow chart showing the foregoing operation of the control unit 9.

Figure 6:
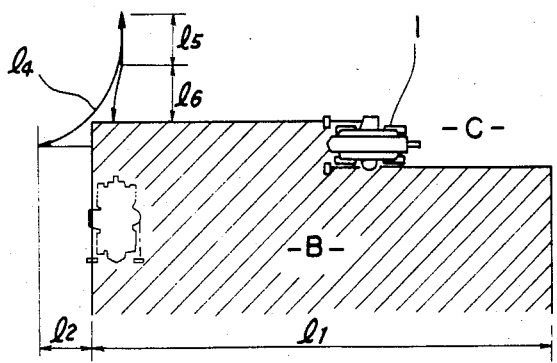
FIG. 6 is a diagram showing the mode of changing direction according to another embodiment.

While the mode of changing the running direction described above for the present embodiment is limited to the case wherein the vehicle body reciprocatingly runs a work site of specified area while changing the running direction through 180 degrees, the running direction can be similarly corrected automatically, for example, in the case wherein the turn 1 is omitted from the foregoing embodiment, i.e. in a turn mowing operation (turning around mode) as shown in FIG. 6 wherein the vehicle body runs along the outer periphery of a work site progressively inward while turning from course to course through 90 degrees.

Further in the case of reciprocating running mode wherein the vehicle body is turned through 90 degrees twice for a 180-degree change of the direction as seen in FIG. 3, the vehicle body may alternatively be turned continuously for the change of direction. The running direction can be similarly corrected automatically also in this case.

Further instead of steering the front wheels 2, 2 and the rear wheels 3, 3 for the correction of orientation of the vehicle body 1, the front wheels 2, 2 or the rear wheels 3, 3 only may be steered.

Furthermore, the orientation of the vehicle body 1 may be corrected not during the straightforward travel thereof in changing the direction but by the time when the vehicle body 1 finishes its turn. In this case, the orientation continuously changes during the turn, so that it is effective to correct the orientation immediately before the completion of the turn.

We claim:

1. An automatic running work vehicle controllable to follow a series of straight courses for working a surface, comprising:

a body;

a plurality of steerable wheels;

a plurality of position sensor means mounted transversely on said body for sensing a boundary between worked and unworked areas and for detecting the front and rear ends of said courses;

orientation sensor means mounted on said body for detecting the running direction of said vehicle; and control means mounted on said body and connected to said position sensor means which detects said front end, rear end of each course and said boundary;

said control means being responsive to the detection of the rear end of one course by said plurality of position sensor means for causing said vehicle to advance the vehicle a first predetermined distance past the next course at a first predetermined angle, to advance the vehicle at a second predetermined angle a second predetermined distance, and then to advance the vehicle and simultaneously adjust the orientation to match a preselected orientation of said next course;

said control means being further responsive to the detection of the front end of the next course by said plurality of position sensor means for causing said vehicle to translate toward a boundary of the next course without changing its orientation until said boundary is detected and finally return to an original mode in which said vehicle follows the next course upon detection by one of said plurality of position sensor means of the boundary thereof between the worked and unworked areas.

2. The work vehicle of claim 1 wherein said plurality of position sensor means includes measuring means for measuring the running distance of the vehicle along a course, and first and second ground sensor means for detecting worked and unworked areas.

3. The work vehicle of claim 2 wherein said rear end is detected by said control means when said measuring means indicates a measured distance equal to a preselected distance and said ground sensor means detect only worked areas; and said front end is detected by said control means when said measuring means indicates substantially no running distance and one of said first and second ground sensor means indicates a worked area while the other ground sensor means indicates an unworked area.

4. The work vehicle of claim 2 wherein said vehicle orientation is adjusted during turning.

5. The work vehicle of claim 2 wherein said vehicle orientation is adjusted while the vehicle is advanced toward the next course.

6. The work vehicle of claim 5 wherein said vehicle is turned by 180 by two forward and one backward turns in a preselected sequence.

7. The work vehicle of claim 5 wherein said first predetermined angle is zero and therefore said vehicle is turned by 90° by a single backward turn.

8. A moving vehicle for working a surface in straight courses comprising:

a plurality of sensor means arranged side by side on the vehicle forwardly of the cutting unit so as to establish respective different sensing areas transversely of the vehicle, each said sensor means for detecting whether said sensing area is mowed or unmowed and for detecting a boundary between a mowed region and an unmowed region within said sensing area;

orientation sensor means for detecting a running direction of the vehicle; and control means connected to said plurality of sensor means for detecting a front and a rear end of the straight course by a combination of said plurality of sensor means;

said control means being provided to store directions of a plurality of straight courses;

said control means being responsive to the detection of a rear end of a course to advance said vehicle straight for a predetermined distance corresponding to an installation spacing longitudinally of the vehicle between the cutting unit and the plurality of sensor means, to turn and advance the vehicle at a predetermined angle over a portion of the mowed region, and to advance the vehicle toward a next straight course while simultaneously adjusting the vehicle orientation to match a preselected stored orientation of the next straight course and said orientation sensor means;

said control means being further responsive to the detection of the front end of the next course by said plurality of position sensor means for causing said vehicle to translate toward a boundary of the next course without changing its orientation until said boundary is detected and finally return to an original mode in which the vehicle follows the next course upon detection by one of said plurality of position sensor means of the boundary thereof between the worked and unworked areas.

* * * * *